June 15, 1926.
W. CURRENT
VALVE CONSTRUCTION
Filed Jan. 25, 1926
1,588,874
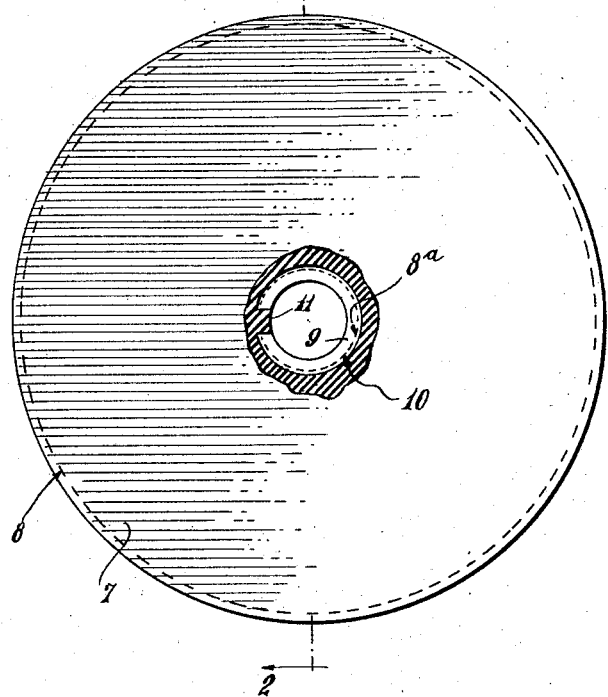
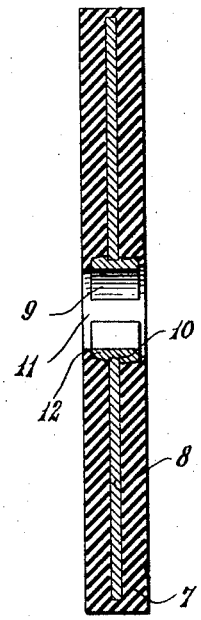
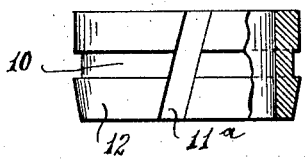
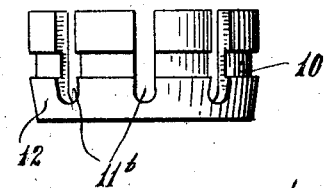
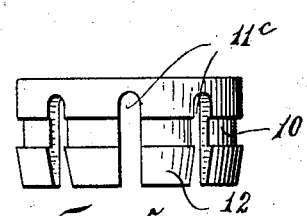
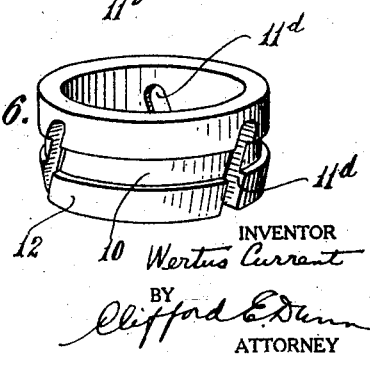
INVENTOR
Wertus Current
BY
Clifford E. Dunn
ATTORNEY Patented June 15, 1926.

1,588,874

UNITED STATES PATENT OFFICE.

WERTUS CURRENT, OF BELLEVILLE, NEW JERSEY, ASSIGNOR TO VOORHEES RUBBER MFG. CO., OF JERSEY CITY, NEW JERSEY, A CORPORATION OF NEW JERSEY.

VALVE CONSTRUCTION.

Application filed January 25, 1926. Serial No. 83,772.

This invention relates to valves, and more particularly aims to provide a new and improved structural combination for a valve wherein component parts are formed of materials of different degrees of hardness, elasticity or the like. Such dissimilar component parts are frequently found in disk valves.

The invention has now in mind, as one of its more important objects, to provide certain improvements having to do with the construction and operation of a disk valve wherein the main valve body is of rubber, and there are also present other elements of a dissimilar material or materials. One of these elements is an inner disk-like or other suitable stiffening member, imbedded in the rubber and usually of metal. The other element is a mounting or wearing collar or sleeve for the center opening in the valve, also imbedded in the rubber and usually of metal. Such a metallic auxiliary arrangement, for the rubber main body of the valve, has been found highly successful in keeping the valve to shape, especially when made of soft rubber; and in overcoming the tendency of the valve to wear out the center opening or hole very rapidly. Such wear had to be defeated, particularly where the disk-like stiffener, usually a steel plate, was employed, as the plate tended to wear away the stud-pin on which the valve was mounted by way of its hole. Such wear caused the valve to wobble on its pin. In a short time, proper seating of the valve was interfered with. The last mentioned trouble was found to be much more noticeable where the valve traveled, as it sometimes did (and still does), on a horizontal or inclined pin. A familiar installation of this kind is in condensers.

To overcome these troubles, it became the practice, and this practice has obtained for years in making up the soft red rubber condenser valves forming one of the products of The Voorhees Rubber Manufacturing Company of Jersey City, New Jersey, to insert in the whole of the valve body a bushing or the like of brass, hard rubber, babbitt or other suitable indurate material. Such a bushing has heretofore constituted the mounting or wearing collar or sleeve hereinabove referred to. The practice as so far described of course constitutes a part of the prior art, and as such, forms no part of the present invention.

According to the teaching of the prior art, however, such bushing, collar or sleeve was only floatingly mounted in the valve body, so to speak, because said bushing was not anchored directly to the steel plate or equivalent.

An important object of the present invention is to provide a bushing or equivalent, for the hole of a rubber and metal valve structure, adapted to prevent wear at the valve hole, and at the same time to avoid the disadvantages flowing from a rocking movement of the bushing relative to the plate. According to the present invention, this is attained by mounting the bushing directly on the plate.

Another important object of the present invention, as the latter is preferably carried out, is to provide such a mounting for the bushing, but a mounting wherein the bushing is fastened directly to the plate by some other means than by riveting the two parts together, by clamping them together permanently, or by otherwise directly engaging them, so as to require cumbersome and expensive riveting, swaging or similar equipment, or time consuming and troublesome shop operations.

Another important object of the present invention, as the latter is preferably carried out, is to provide a means for mounting the bushing on the plate, such that the bushing may be securely anchored to the plate, yet so anchored as the result of a mere spring-latching operation automatically occurring as the bushing is forced through the central hole in the plate, preparatory to forming the rubber body on opposite sides of the plate and around the two end portions of the bushing protruding oppositely beyond the plate.

Another important object of the present invention, as the latter is preferably carried out, is to provide means as last described including an elongate slot, yet so as to avoid any slotting of the bushing parallel to the axis of the stud-pin, thus to let the bushing have a more uniform bearing on the pin.

Another important object of the present invention, as the latter may be carried out, is to provide means to obtain a spring-latch mounting means for the bushing, and yet for insuring that the bushing shall be circumferentially uninterrupted at least at one end, so as not to have any peripheral break at that end interfere with proper seating of the valve.

Various other objects and advantages will be apparent or pointed out hereinafter; and the invention will be more clearly understood from the following description of various illustrative structures as shown in the accompanying drawing. The invention, however, is not to be limited to any of said structures, or to any combinations of features thereof; nor by the fact that quite a number of different structures are illustrated. It will be understood that it has been possible to illustrate in the drawing only a few of the many possible and apparently widely dissimilar embodiments of the invention.

In this drawing,

Fig. 1 is a face view of a disk valve, equipped with a stiffener plate and one form of bushing according to the invention;

Fig. 2 is a transverse section, taken on line 2—2 of Fig. 1;

Fig. 3 is an enlarged view of the bushing of Figs. 1 and 2, but showing a modification in so far as a different elongate slotting is incorporated, the bushing here being shown in side elevation, but partially broken away and partially in section;

Fig. 4 is a view in side elevation, on the same scale as Fig. 3, but showing another modified form of bushing, or rather the same bushing modified as to its elongate slotting;

Fig. 5 is a view similar to Fig. 4, but showing another bushing embodiment; and

Fig. 6 is a perspective view, on the same scale as Figs. 3, 4 and 5, of still a further bushing embodiment.

Referring first to Figs. 1 and 2, the main body of the valve, which may be a mass of soft rubber, is indicated at 7. The stiffener member, which is of course of some harder and more rugged material, is shown at 8. This stiffener may be a steel disk, and in that case is preferably a somewhat flexible steel plate, say one made of cold rolled steel. The bushing, which is also of a material harder and more rugged than the rubber material, is indicated at 9. This bushing is desirably of brass, and may be the product of a screw machine.

It will be noted that the bushing 9 is securely mounted and non-rockably mounted directly on the disk or plate 8, by means of a groove 10 formed around the exterior of the bushing intermediate its ends. It will also be noted that the rigid metallic structure thus provided is further locked together, by the complete imbedding of the plate, and the partial imbedding of the bushing, in the mass of rubber 7. This is desirable in order to make the entire valve structure in effect a unitary member. It will further be noted that the length of the bushing is less than the thickness of the rubber body 7, so that the exposed end faces of the bushing are a slight distance, say $\frac{1}{16}''$, below the opposite faces of the rubber valve body. This is desirable, to avoid any chance of the closing force of the valve against its seat being absorbed by the bushing rather than by the main soft-body of the valve.

In order to permit a bushing constructed according to the invention to be instantaneously mounted on the plate, by a latch-like operation, each of the various bushings illustratively shown in Figs. 3 to 6 is provided, like the bushing 9 of Figs. 1 and 2, with one or more elongate slots; such as the slot 11 of Figs. 1 and 2, the slot 11$^a$ of Fig. 3, the slots 11$^b$ of Fig. 4, the slots 11$^c$ of Fig. 5 and the slots 11$^d$ of Fig. 6.

These or any other suitable slottings of the bushing, coact with a conical taper carried by the bushing at its exterior and beyond its groove 10 on one side of said groove, as indicated at 12, to permit such a bushing to be endwisely advanced with its smaller face foremost toward the center hole (see 8$^a$ in Fig. 1) of the plate, to wedge the taper part of the bushing in said hole. Thereupon a smart hammer blow, or a fairly low powered steady pressure, against the upper or wider end face of the bushing, suffices to cause the taper of the bushing to act on its slot means to reduce the diameter of the bushing, and so permit the bushing to pass further through the central hole of the plate, and until the groove 10 on the bushing comes opposite the inner bounding edge of the plate which surrounds its hole. Thereupon the bushing springs back to its normal full diameter, and the bushing becomes latch-locked on the plate.

The slot 11 of the bushing of Figs. 1 and 2 is continuous, that is, it interrupts both end peripheries of the bushing; and is parallel to the axis of the bushing.

The slot 11$^a$ of the bushing of Fig. 3 is also continuous, but is inclined to the bushing axis. This type of slot, therefore, gives more uniform bearing than the slot 11, for the stud-pin about which the bushing is to take.

Figs. 4, 5 and 6 illustrate some of the many possible arrangements, by which the bushing may be given a plurality of slots. As will be noted, the slots illustrated in these embodiments are not continuous. Figs. 4 and 5 show a plurality of slots parallel to the axis of the bushing, while Fig. 6 shows a plurality of slots all inclined.

It may be explained that, as the invention is at present understood, slottings of the kind shown in Figs. 4, 5 and 6, that is, non-continous slots, are preferred; because then an end of the bushing adjacent to at least one of the faces of the valve will be circumferentially continuous. Consequently that valve face may be advanced toward the stud-pin and the bushing seated, at its continuous end, on the stud-pin shoulder.

It may further be explained that, as the invention is at present understood, slottings of the kind shown in Figs. 5 and 6, that is, cut in at the tapered end of the bushing, are preferred; as giving a better spring action, and as obviating any necessity to bring the inner ends of the slots too close to the adjacent end-periphery of the bushing, which might tend to weaken the bushing or any necessity to give an increased angle to the tapered part of the bushing, which would unduly thicken the wall-portion of the bushing at points removed from such taper.

Obviously, all these indicated slottings are merely illustrative of many others possible. For instance, a plurality of slots may be used such that a continuous slot and also one or more non-continuous slots are present in the same bushing; or such a set of slots, or a plurality of continuous slots, or a plurality of non-continuous slots may be provided, of which one or more may be parallel to the bushing axis, or one or more may be inclined to the bushing axis, or a plurality may be differently inclined to said axis; or any of the foregoing sets of slots may be provided, but including also one or more non-continuous slots cut in from each end of the bushing.

The foregoing detailed enumeration and specific mention of some of the possible slottings within the invention, is of course not to be taken as limiting the invention to the variations described. Nor is such apparent emphasis on the slotting feature to be taken as in any way restrictive so far as the claims following are concerned, which claims, where clear and unambiguous, are solely to measure the scope of protection contemplated. These claims, moreover, are also of course to be given the full range of equivalents. For instance, the groove 10 may have substituted therefor a suitable series of circumferentially spaced pockets, to be snapped into keeper-engagement relative to a similar series of projections carried by the disc or plate 8.

I claim:

1. In a valve having a stiffener structure in its main body, the combination of a mounting structure for the valve, and spring means carried by the last-mentioned structure for directly mounting the same within and on the stiffener structure.

2. In a valve having a stiffener structure in its main body, the combination of a mounting structure for the valve, and snap-latching means carried by the last-mentioned structure for directly mounting the same within and on the stiffener structure.

3. In a valve having a stiffener structure in its main body, the combination of a mounting structure for the valve, and means for directly mounting the same within and on the stiffener structure, said means including a leaf-spring forming a part of the mounting structure.

4. In a valve having a stiffener structure in its main body, the combination of a mounting structure for the valve, and means for directly mounting the same within and on the stiffener structure, said means including a resilient member forming a part of the mounting structure.

5. In a valve having in its main body a stiffener structure provided with a central opening, the combination of a mounting structure for the valve, and means carried by the two structures including the portion surrounding said opening in the stiffener structure whereby when the mounting structure is forced through such opening the two structures are thereby forced to interlock.

6. In a valve having a stiffener structure in its main body, the combination of a mounting structure for the valve, and wedge means carried by the last-mentioned structure for directly mounting the same within and on the stiffener structure.

7. In a valve having a stiffener structure in its main body, the combination of a mounting structure for the valve, and a combined wedge and leaf-spring means carried by the last-mentioned structure for directly mounting the same within and on the stiffener structure.

8. In a valve having a stiffener structure in its main body, the combination of a mounting structure for the valve, and spring and socket means carried by one of said structures for directly mounting the mounting structure within and on the stiffener structure.

9. In a valve having a stiffener structure provided with a central opening, the combination of a mounting structure for the valve, and means whereby when the mounting structure is forced through such opening the two structures are thereby forced to interlock, said means including combined wedge and spring means carried by one of said structures.

10. In a rubber-body valve having an imbedded stiffener structure provided with a central opening, a bushing having an external arcuate groove intermediate its ends for receiving parts of said structure surrounding said opening, said bushing also having a slot intersecting said groove.

11. In a rubber-body valve having an imbedded stiffener structure provided with a central opening, a bushing having an external arcuate groove intermediate its ends for receiving parts of said structure surrounding said opening, said bushing also having a slot intersecting said groove, said slot being prolonged so as at one end to interrupt an end periphery of the bushing.

12. In a rubber-body valve having an imbedded stiffener structure provided with a central opening, a bushing having an external arcuate groove intermediate its ends for receiving parts of said structure surrounding said opening, said bushing also having a slot intersecting said groove, said slot being prolonged so as at one end to interrupt an end periphery of the bushing, said slot extending generally at an angle to the axis of the bushing.

13. In a rubber-body valve having an imbedded stiffener structure provided with a central opening, a bushing having an external arcuate groove intermediate its ends for receiving parts of said structure surrounding said opening, said bushing also having a slot extending generally at an angle to the axis of the bushing.

14. In a rubber-body valve having an imbedded stiffener structure provided with a central opening, a bushing having an external arcuate groove intermediate its ends for receiving parts of said structure surrounding said opening, said bushing also having a slot cut in from one end of the bushing.

15. In a rubber-body valve having an imbedded stiffener structure provided with a central opening, a bushing having an external arcuate groove intermediate its ends for receiving parts of said structure surrounding said opening, said bushing also having a slot intersecting said groove, said bushing being of resilient material and being tapered externally toward one end to provide a wedge means for coacting with the stiffener structure to distort the bushing to forcibly temporarily narrow the slot in applying the bushing.

16. In a rubber-body valve having an imbedded stiffener structure provided with a central opening, a bushing having an external arcuate groove intermediate its ends for receiving parts of said structure surrounding said opening, said bushing being wedge-shaped between said groove and an end of the bushing, said bushing having a slot intersecting its wedge-shaped portion.

17. In a rubber-body valve having an imbedded stiffener structure provided with a central opening, a bushing having an external arcuate groove intermediate its ends for receiving parts of said structure surrounding said opening, said bushing also having a slot cut in from one end of the bushing, said slot being prolonged so as to interrupt said groove.

18. In a valve, the combination of a stiffener plate provided with a central opening, and a bushing having external recess means to receive and retain appropriately shaped edge portions of the plate at said opening, said bushing being exteriorly tapered toward one end and having an elongate slot cut through such tapered portion.

WERTUS CURRENT.